(12) United States Patent  
DiTommaso et al.

(10) Patent No.: US 8,529,155 B2
(45) Date of Patent: *Sep. 10, 2013

(54) METHOD OF MAKING PURE SALT FROM FRAC-WATER/WASTEWATER

(75) Inventors: Frank A. DiTommaso, Short Hills, NJ (US); Peter N. DiTommaso, Franklin Lakes, NJ (US)

(73) Assignee: FracPure Holdings LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,147

(22) Filed: Mar. 15, 2012

(65) Prior Publication Data

US 2012/0168157 A1    Jul. 5, 2012

Related U.S. Application Data

(63) Continuation of application No. 12/823,433, filed on Jun. 25, 2010, now Pat. No. 8,158,097.

(51) Int. Cl.
*C02F 1/00* (2006.01)
*C01F 11/24* (2006.01)
*C01D 3/04* (2006.01)
*B09B 3/00* (2006.01)

(52) U.S. Cl.
USPC ............. 405/129.27; 405/129.2; 405/129.25; 405/129.3; 423/497; 423/499.1; 423/499.4; 423/544; 423/554; 423/430; 210/702; 210/721; 210/723; 210/725

(58) Field of Classification Search
USPC ............. 423/497, 499.1, 499.4, 544, 55, 430; 507/200; 210/702, 721, 723, 725; 23/302 R, 23/303; 405/129.2, 129.25, 129.27, 129.3
See application file for complete search history.

(56) References Cited

U.S. PATENT DOCUMENTS 3,433,312 A    3/1969 Burdyn et al.
3,480,144 A    11/1969 Barth et al.
(Continued)

FOREIGN PATENT DOCUMENTS

GB    2448683 A    10/2008
WO    2006086384 A2    8/2006
WO    2009012378 A1    1/2009

OTHER PUBLICATIONS

Testimony of STW Resources before the Environmental Resources and Energy Committe House of Representatives Commonwealth of Pennsylvania, Harrisburg, Pennsylvania, Apr. 15, 2009.

(Continued)

*Primary Examiner* — Ngoc-Yen Nguyen
(74) *Attorney, Agent, or Firm* — Lerner, David, Littenberg, Krumholz & Mentlik, LLP

(57) ABSTRACT

The present invention relates to a method for making pure salt comprises recapturing post-drilling flowback water from hydro-fracturing; removing oil from the flowback water; filtering the flowback water using an ultra filter with a pore size of about 0.1 microns or less to remove solid particulates and large organic molecules, such as benzene, ethylbenzene, toluene, and xylene, from the water; concentrating the flowback water to produce a brine that contains from about 15 wt % to about 40 wt % of salt relative to the total weight of the flowback brine; performing one or more chemical precipitation process using an effective amount of reagents to precipitate out the desired high quality commercial products, such as, barium sulfate, strontium carbonate, calcium carbonate; and crystallizing the chemically treated and concentrated flowback brine to produce greater than 99.5% pure salt products, such as sodium and calcium chloride.

7 Claims, 7 Drawing Sheets

(56) References Cited

U.S. PATENT DOCUMENTS

| | | | |
|---|---|---|---|
| 3,547,190 | A | 12/1970 | Wilkerson |
| 3,637,031 | A | 1/1972 | Hull et al. |
| 3,681,238 | A | 8/1972 | Emmett |
| 4,035,289 | A | 7/1977 | Guillerme et al. |
| 4,353,803 | A | 10/1982 | Dover, Jr. |
| 4,366,063 | A | 12/1982 | O'Connor |
| 4,366,068 | A | 12/1982 | Ostreicher et al. |
| 4,395,338 | A | 7/1983 | Rowton |
| 4,536,293 | A | 8/1985 | Babineaux, III |
| 4,623,464 | A | 11/1986 | Ying et al. |
| 4,755,303 | A | 7/1988 | Sweat |
| 5,093,008 | A | 3/1992 | Clifford, III |
| 5,260,268 | A | 11/1993 | Forsberg et al. |
| 5,695,643 | A * | 12/1997 | Brandt et al. .................. 210/652 |
| 5,718,298 | A | 2/1998 | Rusnak |
| 5,725,021 | A | 3/1998 | Dallas |
| 6,032,747 | A | 3/2000 | Moody et al. |
| 6,193,070 | B1 | 2/2001 | Rowney et al. |
| 6,365,005 | B1 | 4/2002 | Schleiffarth |
| 6,733,636 | B1 | 5/2004 | Heins |
| 7,022,240 | B2 | 4/2006 | Hart et al. |
| 7,077,201 | B2 | 7/2006 | Heins |
| 7,150,320 | B2 | 12/2006 | Heins |
| 7,399,419 | B2 | 7/2008 | Barbaro et al. |
| 7,428,926 | B2 | 9/2008 | Heins |
| 7,438,129 | B2 | 10/2008 | Heins |
| 7,527,726 | B2 | 5/2009 | Slough et al. |
| 7,681,643 | B2 | 3/2010 | Heins |
| 8,158,097 | B2 | 4/2012 | DiTommaso et al. |
| 2002/0130090 | A1 | 9/2002 | Symens et al. |
| 2004/0016571 | A1 | 1/2004 | Krueger |
| 2007/0102154 | A1 | 5/2007 | Grott |
| 2007/0102359 | A1 | 5/2007 | Lombardi et al. |
| 2007/0211411 | A1 | 9/2007 | Tanaka et al. |
| 2007/0221376 | A1 | 9/2007 | Solomon et al. |
| 2008/0058576 | A1 | 3/2008 | Shafer et al. |
| 2008/0073200 | A1 | 3/2008 | Godshall et al. |
| 2009/0255678 | A1 | 10/2009 | Rosine et al. |
| 2010/0125044 | A1 | 5/2010 | Keister |
| 2010/0261255 | A1 * | 10/2010 | Pereira et al. .............. 435/252.1 |
| 2012/0024525 | A1 * | 2/2012 | Svarczkopf et al. ........... 166/267 |
| 2012/0097614 | A1 * | 4/2012 | Silva et al. .................... 210/667 |

OTHER PUBLICATIONS

Gaudlip et al., "Marcellus Shale Water Management Challenges in Pennsylvania" SPE International, Shale Gas Production Conference, Forth Worth, Texas, Nov. 16-18, 2008.

Arthur et al., "Evaluating Implications of Hydraulic Fracturing in Shale Gas Reservoirs", SPE International, SPE Americas E&P Environmental & Safety Conference, San Anotonio, Texas Mar. 23-25, 2009.

Bernardi et al., "Horizontal Drill-in Fluid Reclamation for Re-use or Waste Minimization Field Trial", SPE/Petroleum Society of CIM International Conference on Horizontal Well Technology, Calgary, Alberta, Canada, Nov. 6-8, 2000.

Parker et al., "New Hydraulic Fracturing Fluid Technolgoy Reduces Impact on the Environment Through Recovery and Reuse", SPE/EPA/DOE Exploration and Producton Environmental Conference, San Antonio, Texas, Mar. 10-12, 2003.

Horn et al, "Breaktrhough Mobile Water Treatment Converts 75% of Fracturing Flowback Fluid to Fresh Water and Lowers CO2 Emissions", SPE Americas E&P Environmental & Safety Conference, San Antonio, Texas, Mar. 23-25, 2009.

Oluwaseun et al., "Applications of Membrane Filtration Technologies to Drilling Wastes", SPE Annual Technical Conference and Exhibition, Denver, Colorado, Sep. 21-24, 2008.

Thompson et al., "Management of Completion Systems Utilizing State-of-the-Art Technologies", SPE Annual Technical Conference and Exhibition, San Antonio, Texas, Sep. 29-Oct. 2, 2002.

Peeters et al., "Membrane Technolgoy Treating Oily Wastewater for Reuse" Corrosion2005 Paper No. 05534, Zenon Environmental Inc., Oakville, Ontario, Canada (2005).

Rimassa et al., "Optimizing Fracturing Fluids From Flowback Water", SPE Tight Gas Completions Conference, San Antonio, Texas, Jun. 15-17, 2009.

Eia et al, "Environmental Advances in Drilling Fluids and Waste Operations Applying Novel Technology for Fluid Recovery and Recycling", SPE Russian Oil and Gas Technical Conference and Exhibition, Moscow, Russia, Oct. 3-6, 2006.

Diehl et al., "San Antonio Water System's Recycled Water Program: Plans/Progress/Case/Histories", Corrosion99, San Antonio, Texas (1999).

International Search Report and Written Opinion, PCT/US2010/039925, dated Aug. 23, 2010.

Kasey, "AOP Clearwater to Use Evaporation for Gas Well Drilling Brine", WBOY-ABC_TV—News for Clarksburg, Fairmont, Morgantown, West Virginia, Feb. 20, 2009.

* cited by examiner

METHOD OF MAKING PURE SALT FROM FRAC-WATER/WASTEWATER

CROSS-REFERENCE TO RELATED APPLICATIONS

The present application is a continuation of U.S. patent application Ser. No. 12/823,433, filed Jun. 25, 2010, which claims the benefit of the filing date of U.S. Provisional Patent Application No. 61/220389 filed Jun. 25, 2009, the disclosure of which is hereby incorporated herein by reference.

BACKGROUND OF THE INVENTION

Many mining and natural gas exploration/production activities generate water contaminated with significant concentrations of chemicals and impurities, eventually being discharged into surface water as well as sub-surface aquifers.

This seriously negatively impacts the quality of water used for drinking, as well as for other domestic and commercial needs. In many areas, the wastewater from drilling and mining operations have rendered regional water supplies unusable.

Hydro-fracturing is one of those mining and natural gas exploration production activities that generates waste water. The well-drilling process is involves injecting water, along with sand and a mixture of chemicals (known as fracking fluid) under high pressure into a bedrock/shale formation via the well. The method is informally called fracking or sometimes hydro-fracking, and is intended to increase the size and extent of existing bedrock fractures. The process involves pumping water into fractures at pressures exceeding 3000 psi and flow rates exceeding 85 gallons per minute in order to create long fracture sand pack intersecting with natural fractures in the shale thereby creating a flow channel network to the wellbore. The fracture width is typically maintained after the injection by sand, ceramic, or other particulates that prevent the fractures from closing when the injection is stopped. Hydro-fracturing releases the methane gas trapped in the natural fractures or pores of the shale so it can flow up the pipe The hydro-fracturing process can use a huge volume of water—up to about several million gallons of water per well. A horizontal well with a 4,500 foot lateral bore, for example, uses about 4 to 5 million gallons of water per well. Accordingly, the hydro-fracturing process can draw millions of gallons of freshwater for use as source water, depleting clean water sources and disturbing the habitat of wildlife.

Hydro-fracturing also generates huge quantities of wastewater. Hydro-fracturing fluids which are injected into a well may contain chemicals that can be toxic to humans and wildlife, including chemicals that are known to cause cancer. These include substances such as: diesel fuel, which contains benzene, ethylbenzene, toluene, and xylene. Some of these chemicals, such as benzene, are considered carcinogenic at very low concentrations.

The flowback water, which is the fluid that comes back up after hydro-fracturing, can include the chemicals pumped in plus both non-toxic and toxic substances that may be present in the shale formation.

Because of the potential negative impact to the environment caused by using hydro-fracturing processes, regulatory agencies are considering a ban on the further issuance of permits.

Accordingly, there is a need for greener technology in drilling wells using hydro-fracturing process including, resulting in purified water containing which can be safely returned to environment. There is also a need to generate over 99% pure salt from the wastewater of the hydro-fracturing process, which can be used commercially, thereby lowering the overall cost of the greener technology in drilling wells as described herein, making its use more desirable.

BRIEF SUMMARY OF THE INVENTION

In one aspect, the present invention relates to methods for making pure salt from wastewater, and more particularly, methods of making pure salt from wastewater generated using hydro-fracturing process.

In another aspect of the present invention relates to methods for generating pure salt, along with purified water, which contains less than 500 ppm, preferably less than 300 ppm, and more preferably less than 100 ppm of Total Dissolved Solids (TDS). In terms of solids, this process can, in some embodiments, generate water, which is cleaner than the tap or bottled water.

In yet another aspect of the present invention relates to methods for making other high quality commercial products, such as barium sulfate, strontium carbonate, calcium carbonate, sodium hypochlorite and lithium hypochlorite.

In accordance with an embodiment of the present invention, a method for making pure salt comprises recapturing post-drilling flowback water from hydro-fracturing; removing oil from the flowback water (preseparation); filtering the flowback water using an ultra filter with a pore size of about 0.1 microns or less to remove solid particulates and large organic molecules, such as benzene, ethylbenzene, toluene, and xylene, from the water (ultrafiltration); concentrating the flowback water to produce a brine that contains from about 15 wt % to about 40 wt %, preferably from about 20 wt % to about 35 wt %, and more preferably from about 25 wt % to about 30 wt % of salt relative to the total weight of the flowback brine (brine concentration); performing one or more chemical precipitation process using an effective amount of reagents to precipitate out the desired high quality commercial products, such as, barium sulfate, strontium carbonate, calcium carbonate (chemical precipitation); and crystallizing the chemically treated and concentrated flowback brine to produce greater than about 98%, preferably about 99% or more, more preferably about 99.5% or more, and most preferably about 99.7% or more of a pure salt, such as sodium and calcium chloride (crystallization).

In one embodiment, the source water for hydro-fracturing process is obtained from one or more sources including, but not limited to, pretreated orphaned/abandoned mine drainage water, pretreated other wastewater, freshwater, and recycled condensates from one or more evaporator units in the concentration and/or crystallizing steps.

In accordance with an aspect of the invention, before the chemical precipitation, the chemical constituents and amounts of those chemical constituents in the concentrated flowback brine are identified and/or quantified to determine an effective amount of reagents to be used during chemical precipitation. This can maximize the yield of certain high quality commercial products, for example, barium sulfate, strontium carbonate, calcium carbonate and the salt products. In one embodiment, the chemical precipitation process is performed after the brine concentration step. In another embodiment, the chemical precipitation process is performed before the brine concentration step. In yet another embodiment, the chemical precipitation process is performed at two stages, i.e., first, either before or after the brine concentration step, and second, after the crystallization step.

In accordance with yet another aspect of the invention, the steps of removing oil from the flowback water, filtering the flowback water, and concentrating the flowback water to form a brine are performed "on-site" which means at the site of drilling (does not require transport); and the steps of performing chemical precipitation process to remove contaminants from the concentrated flowback water, and crystallizing the chemically treated and concentrated flowback brine are performed at "off-site" which means a location which is remote from the drilling site (requires transport—not just pumping through conduits or pipes). By performing the step of concentrating hydro-fracturing brine on-site, the amount of brine to be transported to an off-site brine treatment facility is significantly reduced, thereby reducing the amount of pollution created by trucks transporting brine. This also minimizes the damage done to roads and reduces overall cost related to trucking. In addition, the water produced during the step of concentrating flowback water using an evaporator to create a brine using one or more evaporators, reverse-osmosis or both or any other technique, such as distillation, may be reused as the source water for hydro-fracturing process, reducing the amount of water needed from other sources.

In another embodiment, all of the steps, i.e., steps of removing oil, filtering, concentrating the amount of salt in the brine, performing chemical precipitation, and crystallizing the chemically treated and concentrated flowback brine to produce over 98% pure salt are performed at an "off-site" facility.

When the flowback water is transported directly to an "off-site" treatment facility, chemical precipitation can be performed before or after the flowback water is concentrated.

When the flowback water is first treated on-site, for example, at a mobile treatment plant, then the flowback water is first concentrated to create a brine, followed by a chemical precipitation process.

In a preferred embodiment, the step of concentrating the flowback water to produce a brine is done by using one or more evaporator, such as a mechanical vapor recompression or forced circulation type evaporator, by one or more reverse osmosis or some combinations thereof.

In one aspect of the invention, the pure salt products produced by the step of crystallizing the concentrated brine is selected from the group consisting of a dry salt of sodium chloride, a salt solution of calcium chloride, and mixtures thereof. In one embodiment of the invention, the salt solution of calcium chloride is further processed to produce calcium chloride in the form of dry salt. In another embodiment of the invention, the sodium chloride is further processed to produce sodium hypochlorite.

In an aspect of the invention, certain high quality commercial products, such as barium sulfate, strontium carbonate, and calcium carbonate, can be recovered from the flowback brine to be sold as commodities. In one embodiment of the present invention, barium sulfate is obtained by performing the chemical precipitation process after the brine concentration step. In yet another aspect of the invention, an additional chemical precipitation process is performed after the crystallization step to precipitate out strontium carbonate, calcium carbonate, and mixtures thereof.

The present invention is a significant advance. Rather than merely diluting the post-drilling flowback water through a municipal wastewater treatment facility before it is discharged to the environment, the present invention allows large quantities of concentrated brine solutions of poor quality containing various contaminants into over 99%, pure commercial grade dry salt, and over 99% pure commercial grade concentrated salt solution and allows for reuse of significant quantities of water. In addition to the high quality commercial products and pure salts produced, the present invention con- currently produces purified water which, in some embodiments, contains less than 500 ppm, preferably less than 300 ppm, and more preferably less than 100 ppm of Total Dissolved Solids (TDS). Moreover, the present invention also makes or facilitates production of other high quality commercial products, such as barium sulfate, strontium carbonate, calcium carbonate, sodium hypochlorite and lithium hypochlorite.

The present invention not only provides environmentally friendly solutions to hydro-fracturing well drilling process, but also provides a cost effective solution by producing these high quality commodities, e.g., pure salts, such as sodium chloride and calcium chloride, sodium hypochlorite, barium sulfate, strontium carbonate, calcium carbonate, and lithium hypochlorite.

The present invention also provides more environmentally friendly and cost effective process by providing mobile treatment plant, allowing the condensate which is purified water containing less than 500 ppm TDS to be reused as source water for the well drilling/hydro-fracturing process.

DETAILED DESCRIPTION

Figure 1:
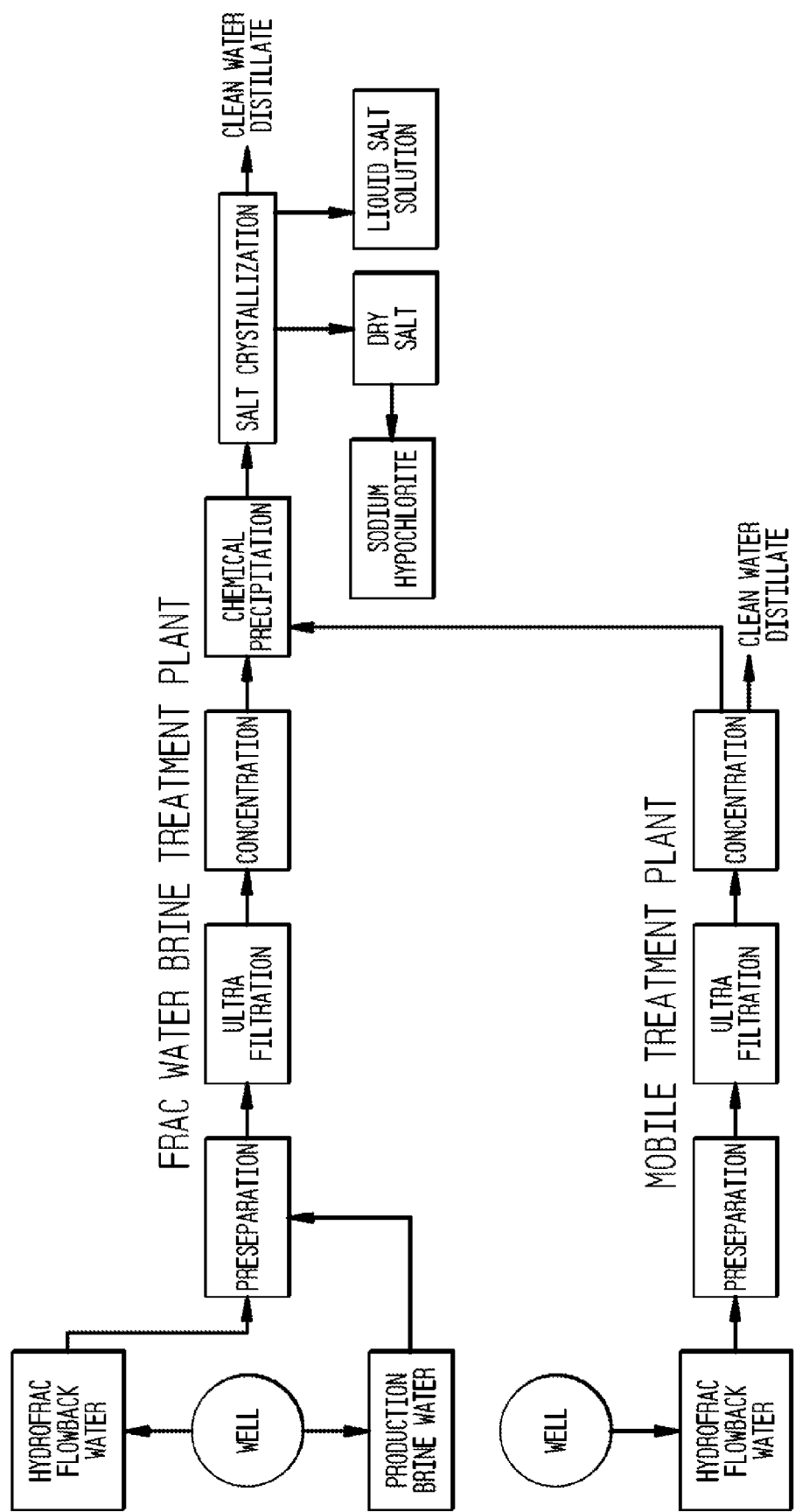
FIG. 1. is a generalized process flow diagram illustrating one embodiment of the present invention.

While the specification concludes with the claims particularly pointing and distinctly claiming the invention, it is believed that the present invention will be better understood from the following description. All percentages and ratios used herein are by weight of the total composition and all measurements made are at 25° C. and normal pressure unless otherwise designated. All temperatures are in Degrees Celsius unless specified otherwise.

The present invention can comprise (open ended) or consist essentially of the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention. Preferably, such additives will not be present at all or only in trace amounts. However, it may be possible to include up to about 10% by weight of materials that could materially alter the basic and novel characteristics of the invention as long as the utility of the compounds (as opposed to the degree of utility) is maintained.

All ranges recited herein include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value.

The term "effective amount" as used herein, refers to a sufficient amount of reagents to precipitate out the various chemical constituents in the flowback water, which would then be able to produce pure salt and/or as appropriate, other high quality commercial products, such as barium sulfate, strontium carbonate, calcium carbonate, sodium hypochlorite.

Unless otherwise indicated, any and all numbers expressing quantities, chemical properties, concentrations, temperatures, weight and other such numerical data are to be understood as being prefaced in all cases by the term "about", unless otherwise specifically noted. In addition, the steps of methods disclosed and claimed herein do not impose a specific order on the performance of these steps, unless otherwise a particular order is expressly indicated in the specification.

When referring to concentrations of contaminants or components in water, treated or untreated, or to properties of water such as pH or viscosity, unless otherwise indicated, those concentrations or numerical values shall refer to the results of the analytical testing of a typical sample taken and analyzed by accepted laboratory methods and procedures currently used in the industry.

The present invention provides greener technology in drilling wells using hydro-fracturing process, which also produces producing high quality commercial products, e.g., over 99% pure salts, such as sodium chloride and calcium chloride, and other high quality commercial products, such as sodium hypochlorite, barium sulfate, strontium carbonate, calcium carbonate and lithium, thereby lowering the overall cost of the greener technology.

In a preferred embodiment, and as illustrated in FIG. 1, the method of the present invention first recaptures post-drilling flowback water from hydro-fracturing. Then, the flowback water goes through a preseparation step to remove oil and grease ("O&G") from the flowback water. Subsequently, the effluent from the preseparation step is introduced to the ultrafiltration step. In this step, solid particulates and large organic molecules such as benzene, ethylbenzene, toluene, xylene and other contaminants, such as, for example microorganisms, are removed from the flowback water. We note that although the step is called "ultrafiltration" step throughout the application, the term "ultrafiltration" is not limited to filtering using an ultra filter, but also encompasses any method of removing solid particulates and large organic molecules such as benzene, ethylbenzene, toluene, xylene and other contaminants, such as, for example microorganisms from the flowback water. Such method of removing solid particulates, organic molecules and/or microorganisms may be done by using, for example, an ultra filter, a micro filter, clarifier, carbon filter, an organic stripper and the like and any combinations thereof.

Next, the effluent from the ultrafiltration step is introduced to a brine concentration step, concentrating the amount of salt in the flowback water using an evaporator, reverse osmosis or both so that a concentrated flowback brine is created. The brine comprises from about 15 wt % to about 40 wt %, preferably from about 20 wt % to about 35 wt %, and more preferably from about 25 wt % to about 30 wt % of salt, preferably sodium chloride, relative to the total weight of the concentrated flowback brine.

Then, the effluent from the brine concentration step goes through a chemical precipitation process using an effective amount of reagents to remove desired high quality commercial products, including, but not limited to barium sulfate, strontium carbonate, and/or calcium carbonate, from the concentrated flowback brine. The effluent from the chemical precipitation process then proceeds to a crystallization process to produce greater than about 98%, preferably about 99% or more, more preferably about 99.5% or more, and most preferably about 99.7% or more pure dry and liquid salt products. The purified water containing less than 500 ppm TDS produced from the steps of concentrating and crystallizing the brine can be returned to the environment or reused as source water for well drilling/hydro-fracturing process. The dry salt produced from the crystallization step can be further process to make sodium hypochlorite.

The method comprising all of the steps above may be performed at an off-site brine treatment facility. In a preferred embodiment, one of more of the steps of removing oil from the flowback water, filtering the flowback water, and concentrating the amount of salt in the flowback water to produce a brine are performed on-site; and the steps of performing chemical precipitation process using the effective amount of reagents to remove contaminants from the brine, and crystallizing the chemically treated and concentrated flowback brine to produce over 98% pure salt are performed at off-site.

In still another embodiment, some concentration of the brine can be undertaken on-site and additional concentration can be undertaken off-site.

The chemical precipitation process following crystallizing can generate the desire high quality commercial products from the liquid salt product, such as strontium carbonate and calcium carbonate. In yet another preferred embodiment, the method further comprises producing sodium hypochlorite from the dry salt product.

FIG. 1 illustrates one embodiment of the invention where the chemical precipitation process is performed after the brine concentration step. However, in another embodiment, the chemical precipitation process may be performed before the brine concentration step. In yet another embodiment, the chemical precipitation process may be performed at two stages, i.e., first, either before or after the brine concentration step, and second, after the crystallization step.

Figure 7:
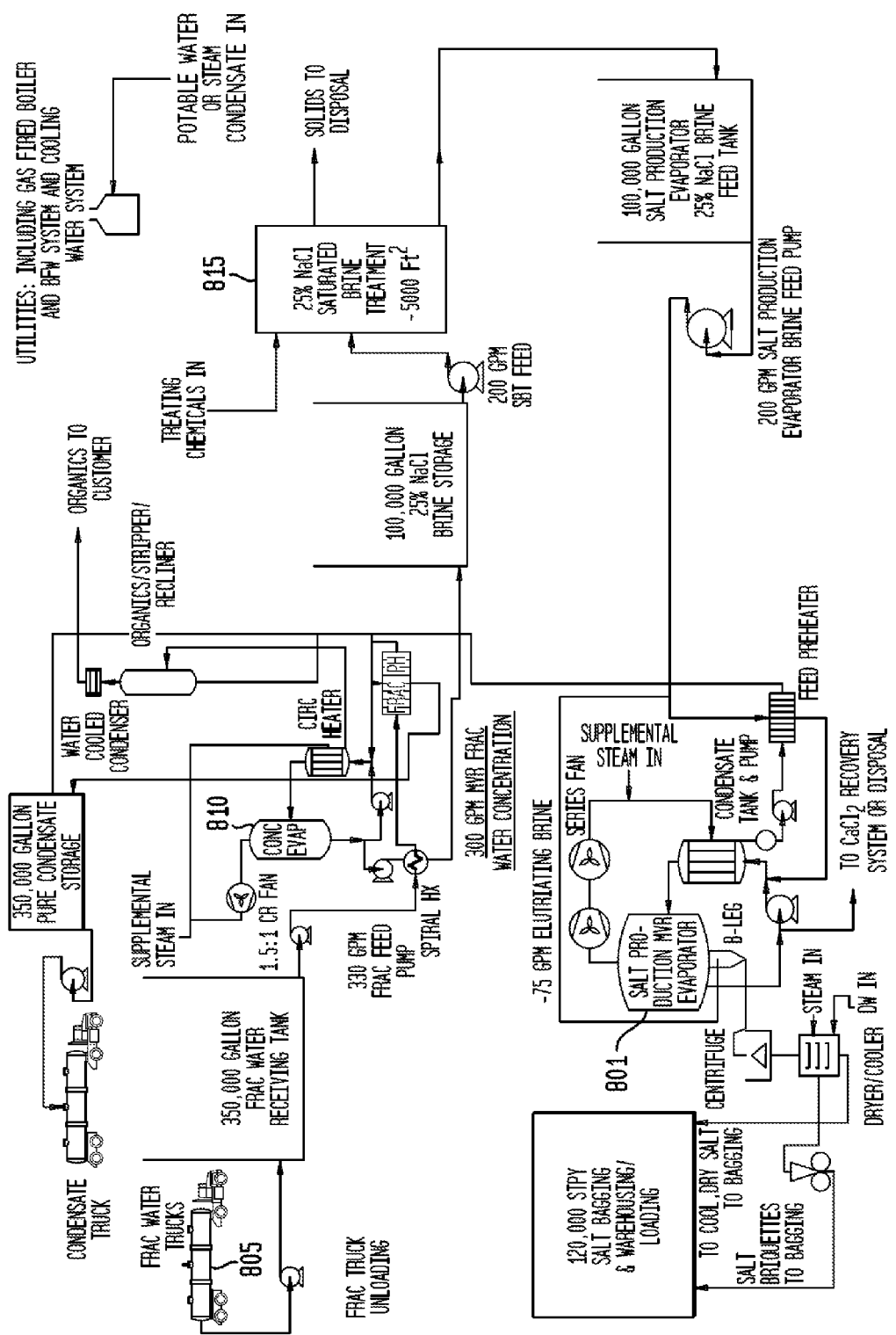
FIG. 7 is a generalized process flow diagram including the crystallization step using a mechanical vapor recompression evaporator.

According to another embodiment illustrated in FIG. 7, the recaptured flowback hydro-fraturing water 805 which may or may not have been concentrated on-site, is transported to an off-site facility where the flowback water is concentrated using an evaporator 810 to produce a brine containing from about 25 weight % of sodium chloride salt relative total weight of the concentrated brine, which is then exposed to chemical precipitation process 815 to obtain one or more high quality commercial products, such as barium sulfate, strontium carbonate, and/or calcium carbonate. The effluent from the chemical precipitation step is subsequently crystallized using an mechanical vapor recompression evaporator (MVR) 801 to produce over about 98%, preferably over 99%, more preferably over 99.5% pure salt products.

Figure 2:
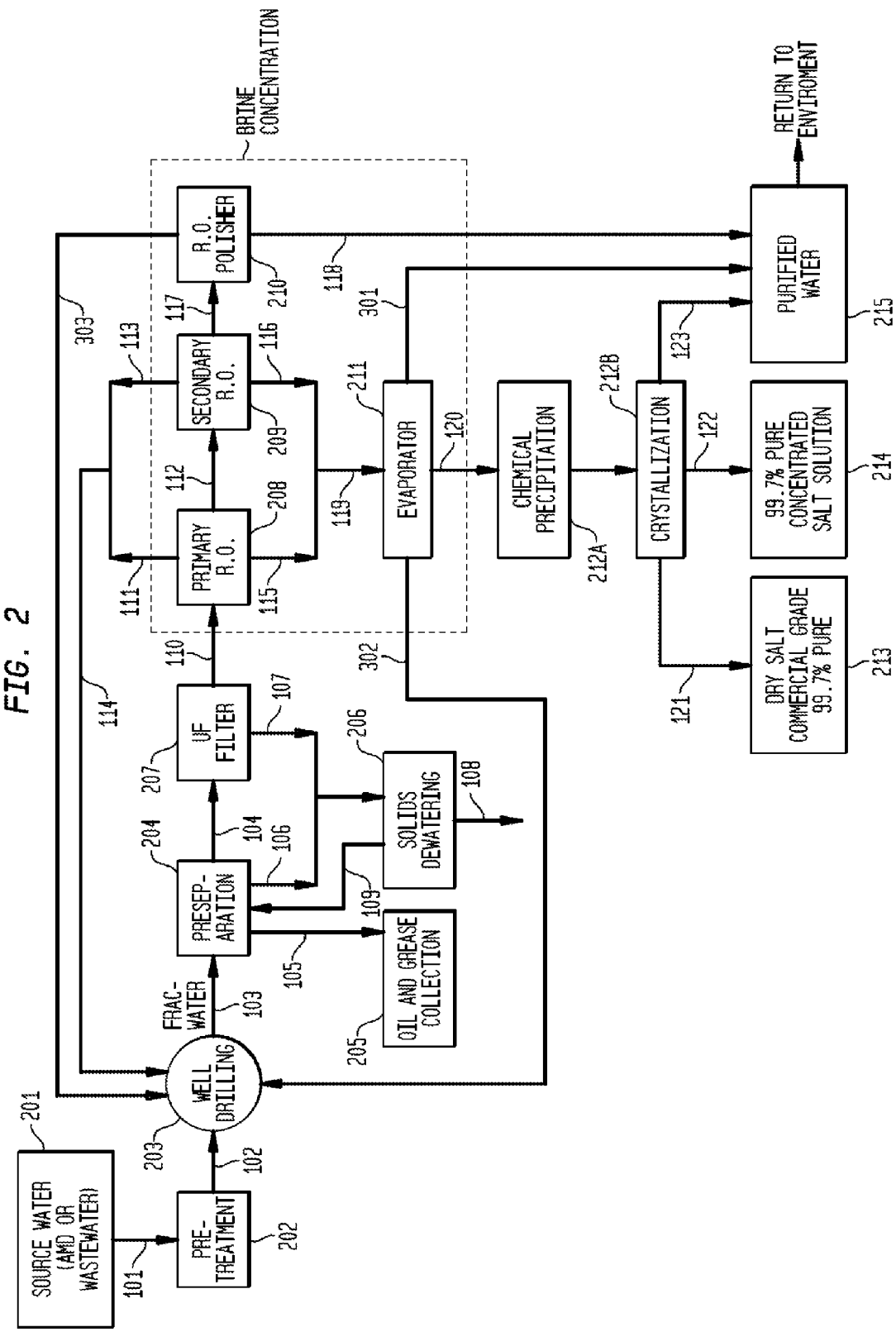
FIG. 2 is a generalized process flow diagram illustrating another embodiment of the present invention.

FIG. 2 illustrates yet another embodiment of a system for treating contaminated water and to produce pure salts. Source water 201 for the process may be from one or more sources, depending primarily on geographical proximity of the well-drilling site to various types of source water. The source water includes, but not limited to an orphaned/abandoned mine drainage ("AMD"), wastewater ("WW"), freshwater, condensates from the on-site evaporator and/or concentration units, or condensates from off-site evaporator and/or condensation units and/or water resulting from later steps such as from crystallization units.

In case the source water is either AMD or WW 201, such water could be treated at the source or at a pretreatment facility 202 and then piped or transported 102 to the drilling site. At the site, water may be discharged into either holding tanks or temporary storage ponds before hydro-fracturing.

The pretreatment process 202 can vary as to the quality/quantity of source water 201. Each batch of source water 201 could be pretreated to the established regulatory parameters before introducing the pretreated source water 202 into the earth's substrata via the drilling process.

Pretreated source water 102 may flow into the drilling operation 203 wherein it may be mixed with a number of chemicals/additives to alter the suitability of the pretreated source water 102 to a particular phase or requirement of the drilling and hydro-fracturing process. The additives may include materials known as fracturing gels, as well as viscosity reducers, friction reducers, clay and shale stabilizers, and a number other additives. The flowback water (also may be referred herein as fracwater) 103 which flows back out of the well 203 will be treated in subsequent processes to remove these and other materials.

In one embodiment of the present invention, the untreated frac-water 103 may flow into the treatment system on-site near the well 203. This treatment system may be mobile.

The daily volume of water 201 either used for drilling and/or hydro-fracturing and the daily volume of fracwater 103 flowing back out of the well on any given day can vary significantly. Based on the total time and total volume of water expected to be used under actual conditions, and the anticipated rate of the flowback of fracwater from the well, a working estimate used for illustration purpose only in the Tables below is about 150,000 gallons per day. The actual volume of water may vary and may be greater or lower than the estimate.

Given that initial flowback conditions diminish rapidly with time, frac-tanks or holding ponds could be used to hold the untreated fracwater collected from the well flowback. The storage volume could be sized accordingly to contain the maximum daily flow of frac-water, from which a certain amount of water would be drawn into the treatment process and to produce pure salt.

The average daily rate of about 150,000 gpd may flow into an on-site treatment system. This on-site treatment system maybe mobile.

Preseparation

Preseparation may include an inclined plate separator to separate oil and/or grease and water, and also to remove large particulates from the flowback frac-water 103. Units manufactured by JDI, Inc., Hydroquip or other equivalents could be chosen and utilized for this purpose. Collected oil and/or grease 105 removed from the oil/water preseparation process using additional stages such as settling, aeration and/or skimming can be accumulated in a temporary storage tank and removed to a permitted receiving facility. Table 1 below indicates an example of the influent flow and targeted parameters for treatment and removal at this first phase of post-drilling preseparation.

TABLE 1

| Preseparation of Flowback Fracwater | | | |
|---|---|---|---|
| Influent | Flow | 150,015 | gpd |
| | TDS (Total Dissolved Solids) | 45,000 | ppm |
| | TSS (Total Suspended Solids) | 150 | ppm |
| | O&G (Oil and Grease) | 100 | ppm |
| Effluent | Flow | 149,940 | gpd |
| | TDS | 45,000 | ppm |
| | TSS | 15 | ppm |
| | O&G | 10 | ppm |
| Oil Water Separator-Colescer | Rated Flow | 175 | gpm |
| | Media Pack | 0.5 | ft3/gpm |
| | Plate Spacing | 0.75 | in |
| Solids Clarification | Rated Flow | 175 | gpm |
| | Plate Spacing | 1.0 | in |
| | O&G | 0 | |
| Chemical Dosing | None | | |

Ultrafiltration

Following preseparation 204, the water 104 is subjected to ultrafiltration 207. Ultrafiltration 207 uses a mechanical filter with a pore size of from about 0.01 to about 0.1 micron. This filter will screen out suspended solid particles, colloidal solids, and large organic molecules such as acrylamide, benzene, ethylbenzene, toluene, and xylene, and possibly even microorganisms in the flowback water 104.

Table 2 below indicates an example of influent and effluent characteristics for the ultrafiltration process 207 as well and the components of the system.

TABLE 2

| Ultrafiltration step | | | |
|---|---|---|---|
| Influent | Flow | 149,940 | gpd |
| | TDS | 45,000 | ppm |
| | TSS | 15 | ppm |
| | O&G | 10 | ppm |
| Effluent | Flow | 149,933 | gpd |
| | TDS | 45,000 | ppm |
| | TSS | 0 | |
| | O&G | 0 | |
| Process Feed Tank-Frac Tank | Capacity | 21,000 | gallons |
| Ultrafilter | Membranes | Tubular 8 mm .D PVDF | |
| | Circ Pump | 100 HP | |
| | System Size | Containerized | |
| Chemical Feed Pump-pH Adjustment | Reagents | Sulfuric Acid Caustic Soda | |

As mentioned above, this step is not limited to filtering using an ultra filter, but encompasses any method of removing solid particulates and large organic molecules such as benzene, ethylbenzene, toluene, xylene and other contaminants, such as, for example microorganisms from the flowback water. Such method of removing solid particulates, organic molecules and/or microorganisms may be done by using, for example, an ultra filter, a micro filter, clarifier, carbon filter, an organic stripper and the like and any combinations thereof.

Both the preseparation 204 and ultrafiltration 207 stages are the primary point of oil and/or grease separation and solids removal, removing an estimated 125 lb/day of oil and 170 lb/day of solids, primarily in the form of fracture rock and rock dust per 150,000 gallons of fracwater 103.

Solids 106, 107 from preseparation and ultra-filtration 207 flow into a solids dewatering process 206. Influent and effluent rates of that process as well as the system components are indicated on Table 3 below. Dewatered solids 108 from the process as well as the system components are indicated on Table 3. These dewatered solids may be sent to a proper waste disposal felicity.

TABLE 3

| Solids Dewatering | | |
|---|---|---|
| Influent | Flow | 900 gpd |
| | TSS | 25,000 ppm |
| Effluent-Filtrate | Flow | 833 gpd |
| | TSS | 15 ppm |
| Effluent-Solids | Mass | 750 lb/d |
| | % Moisture | 75% |
| Sludge Tank | Capacity | 5,000 gallon |
| | Type | Cone Bottom |
| Chemical Conditioning | Coagulant/Floc | Polymer |
| Filter Press | Capacity | 10 ft³ |
| | Type | Plate & Frame |

Liquid extracted from the solids dewatering step 206 in this process 109 are returned to the preseparation process 204. Process water 109 could also be returned to source water holding facilities, pretreatment facilities 202, or could be further treated and released into the general water supply.

Concentration/Brine Formation

Effluent water from ultrafiltration stage 207 next flows into a system 300 which would concentrate the amount of salt in the flowback frac water to reduce the volume of created brine.

There are various ways to concentrate the salt brine. For example, one or more evaporator or one or more reverse osmosis devices or both, or any other suitable techniques such as distillation.

In an embodiment of the present invention, effluent water 110 from ultrafiltration stage 207 flows into the multistage reverse osmosis process 208, 209, 210, and then to one or more evaporators 211. In a preferred embodiment, the multistage reverse osmosis process step is optional. The clean water distillate 301, 302 and 303 created in this step may be returned as source water for well-drilling/hydro-fracturing process or discharged to the environment. "Clean water distillate" refer to water that is sufficiently clean to return to the environment, although it could be recycled and reused as source water for hydro-fracturing. Clean water distillate generally results from an evaporation step (with or without the use of R.O.), but can result from use of R.O. alone 303. If no R.O. step is used, the ultrafiltered water 110 can flow directly into one or more evaporators 211. Evaporators 211 include, without limitations, static ponds, distillation apparatus, condensers and the like. The clean water distillate created in this step may have less than 500 ppm of total dissolved solids, which is less than the amount of total dissolved solids from a tap water. In other embodiments, the amount of total dissolved solids may be less than 300 ppm or more preferably less than 100 ppm.

This step concentrates the amount of salt in the flowback water so that the concentrated flowback water becomes a brine (concentrated flowback brine) that contains from about 15 wt % to about 40 wt %, preferably from about 20 wt % to about 35 wt %, and more preferably from about 25% wt % to about 30 wt % of salt relative to the total weight of the concentrated flowback brine.

Figure 3:
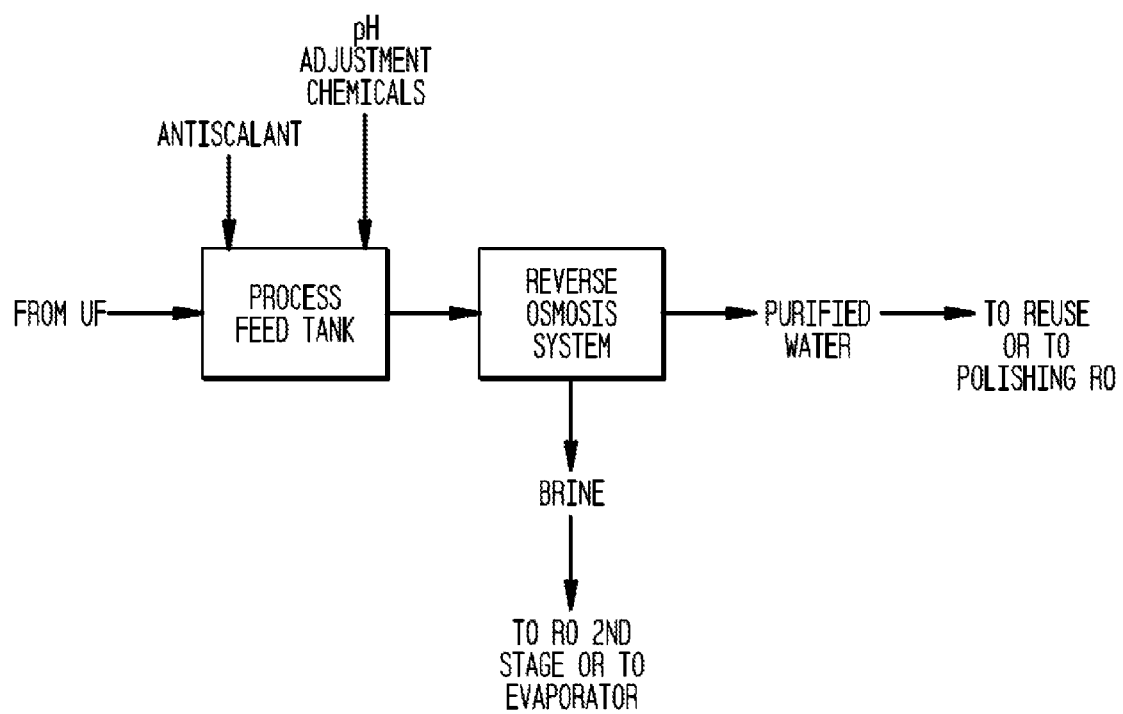
FIG. 3 is a flow diagram illustrating the stage 1 reverse osmosis aspect in accordance with an aspect of the invention.

As noted earlier, use of reverse osmosis ("RO") is an optional step used in conjunction an evaporator 211 or other device used to concentrate the amount of salt in the flowback fracwater such as 115 or 116. FIG. 3 describe the first stage of RO process 208. RO preferably operates at pressures between 200 and 2000 psi. Table 4 below exemplifies the influent and effluent characteristics and quantities, and the components of the process 208.

TABLE 4

| Influent | Flow | 149,933 gpd |
|---|---|---|
| | TDS | 45,000 ppm |
| | TSS | 0 ppm |
| | O&G | 0 ppm |
| Effluent-Permeate | Flow | 82,810 gpd |
| | TDS | 2,010 ppm |
| | TSS | 0 |
| | O&G | 0 |
| Effluent-Reject | Flow | 67,123 gpd |
| | TDS | 101,000 ppm |
| | TSS | 0 |
| | O&G | 0 |
| Feed Tank-Frac Tank | Capacity | 21,000 gallons |
| Reverse Osmosis | Membrane Type | TFC |
| | Membrane Configuration | Spiral Wound |
| | Operating Pressure | 1200 psi |
| | Pump HP | 120 HP |

As illustrated in FIG. 2, from the first-stage RO process 208, the effluent 111 ("permeate") still has a reasonable high concentration of total dissolved solids (TDS) and is not ready to be discharged back into the environment. It is, in short, not sufficiently clean to be considered clean water distillate. However, it may be returned directly to the drilling operation 203 for reuse since it has been stripped of total suspended solids (TSS), oils and grease and large organic molecules in addition to the greater than 0.01 micron sized materials in the ultra-filtration 207 process. Reject effluent 112 flows to a second-stage RO process 209 wherein the permeate 113 produced is again acceptable for reuse in the drilling process 203. Effluent 115 can instead flow directly to one or more evaporators 211. Removal of the permeate concentrates the dissolved solids in the reject effluent 116 or 117. Table 5 indicates the influent and effluent characteristics and lists the components of the second stage RO process 209. At this point in the fracwater/wastewater reclamation and purification process, about 67,000 gallons of the 150,000 gallon daily input of fracwater 103 remain as reject effluent 119 after being discharged 115, 116 from the first and second stage RO processes. The other 83,000 gallons of permeate 111, 113 from both processes 208, 209 can be returned 114A directly to the drilling process 203.

TABLE 5

| Influent | Flow | 67,123 gpd |
|---|---|---|
| | TDS | 101,000 ppm |
| | TSS | 0 ppm |
| | O&G | 0 ppm |
| Effluent-Permeate | Flow | 10,963 gpd |
| | TDS | 3,670 ppm |
| | TSS | 0 |
| | O&G | 0 |
| Effluent-Reject | Flow | 56,160 gpd |
| | TDS | 120,000 ppm |
| | TSS | 0 |
| | O&G | 0 |
| Feed Tank-Frac Tank | Capacity | 21,000 gallons |
| Reverse Osmosis | Membrane Type | TFC |
| | Membrane Configuration | Disc Stack |
| | Operating Pressure | 1750 psi |
| | Pump HP | 75 HP |

Effluent from the second stage RO process 209 flows to an RO polisher 210 to produce extremely high quality permeate 118 which can qualify as a clean water distillate that can be returned to streams or water bodies in the environment 124. This water can also sent back to the well drilling site and the water 303 can be reused as hydro-fracturing water. Table 6 indicates the anticipated volumes and characteristics of the second stage RO influent and effluent.

Reject effluent 119 from the first and/or second stage RO processes 208, 209 flows into an evaporation unit 211 at the drilling site. The purpose of this step is to further concentrate the flowback water from the RO processes 208, 209 before introducing the effluent to both chemical treatment and crystallization processes. As noted earlier, since RO is optional, effluent 110 could flow directly into an evaporator 211 as a reject effluent 119.

The evaporator 211 may be any device including a flash point evaporator or flush point evaporator. Flash point evaporation is accomplished by first heating the flowback water, then pumping into a low-pressure tank. Because the boiling point of water drops with the decrease in air-pressure, the water will then vaporize almost immediately, flashing into steam. The steam is then condensed into clean water. The waste product 120 of this process is a solution with a high salt concentration, which also contains small organic materials, inorganic materials including, but not limited to high quality commercial products, such as barium sulfate, strontium carbonate, and calcium carbonate and/or other contaminants. This concentrated flowback brine from the evaporator may fed into the chemical treatment process 212 to precipitate out small organic materials, inorganic materials including, but not limited to high quality commercial products, such as barium sulfate, strontium carbonate, and ancalcaium carbonate and/or other contaminants from the concentrated flowback brine before producing greater than about 98%, preferably about 99% or more, more preferably about 99.5% or more, and most preferably about 99.7% or more pure salt in the crystallization step. The clean distillate water recovered can be sent back to the well drilling site to be used as hydro-fracturing water 302 and 303, or returned to the environment 118 and 301.

An evaporator 211, may also be a mechanical vapor recompression evaporator, which generally contains a multi-effect evaporator train, which operates at successively lower pressure and temperatures. Steam from a high-pressure evaporator boils water into an adjacent lower pressure evaporator.

Vapor compression involves pulling vapors from the low pressure evaporator, compressing the resulting vapor, and then returning them to the high-pressure evaporator to use the pressurized vapor as a heat source to evaporate additional feed water. The waste product from these processes is a solution 120 with a high salt concentration with other constituents therein. Multiple evaporation stages using the same or different devices may also be used. Moreover, the concentration step may be accomplished on-site, off-site or both.

This concentrated flowback brine from the mechanical vapor recompression system or other evaporator 120 may fed into the chemical treatment process 212 to precipitate out small organic materials, inorganic materials including, but not limited to high quality commercial products, such as barium sulfate, strontium carbonate, and calcium carbonate and/or other contaminants from the concentrated flowback brine before producing greater than about 98%, preferably about 99% or more, more preferably about 99.5% or more, and most preferably about 99.7% or more pure salt in the crystallization step. The water removed from the process, such as that which evaporates, is clean enough to be returned to the environment 301 or used as source water 302.

Chemical Precipitation Process

As shown in FIG. 2, the concentrated brine 120 may be exposed to one or more chemical precipitation processes 212A to recover high quality commercial products, such as barium sulfates, strontium carbonates and calcium carbonates, which can be sold as commodities, and/or to produce salt products (dry and liquid). Thereafter, the chemically treated brine may be subjected to one or more crystallization steps 212B.

Additional chemical precipitation process may be performed after the crystallization step(s) 212B to precipitate out the additional high quality commercial products.

When the flowback water is transported directly to an off-site treatment facility, chemical precipitation process 212A may be performed before or after the water is concentrated. However, if the flowback water may be first treated on-site at the drilling site using the mobile treatment plant as illustrated in FIG. 1, then the flowback water may be first concentrated on-site, and subsequently, the concentrated brine may be transported to the off-site treatment facility to undergo chemical precipitation and crystallization steps. In another embodiment of the invention, the flowback water may also be chemically treated on-site.

Figure 4:
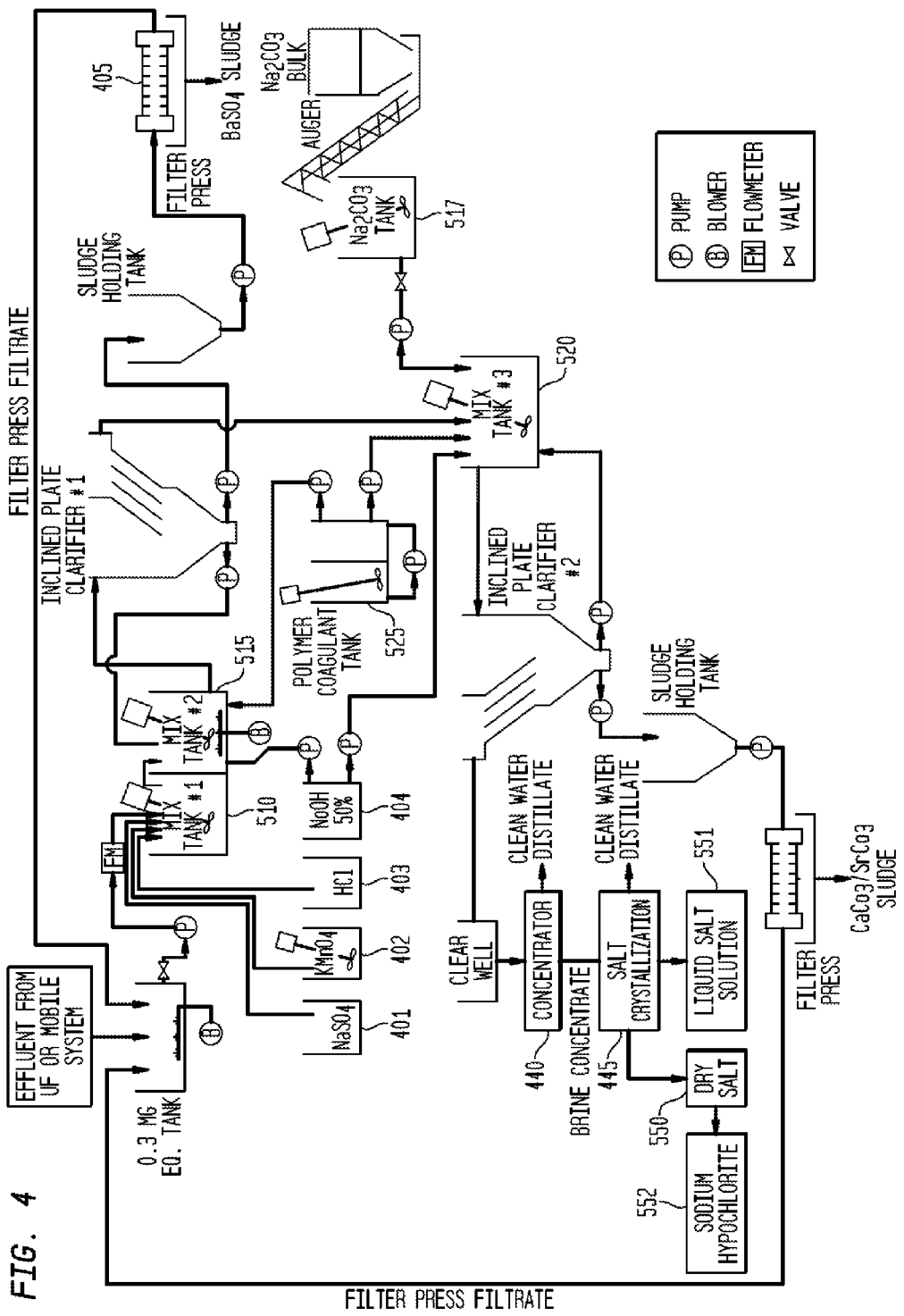
FIG. 4 is a flow diagram illustrating the chemical treatment step in accordance with an aspect of the invention.

As shown in FIG. 4, in an embodiment of the present invention, barium sulfate ($BaSO_4$) 405 and strontium carbonate ($SrCO_3$) and calcium carbonate ($CaCO_3$) 530 may be obtained during the chemical precipitation step before the effluent is concentrated 440 and subsequently sent to the crystallization step 445 to obtain salt products 550 and 551. Various reagents which can be used in one or more chemical precipitation includes, but not limited to, sodium sulphate, potassium permanganate, aluminum chloride, sodium carbonate, sodium hydroxide, hydrochloric acid, and mixtures thereof.

In one embodiment, the concentrated brine chemical treatment process employs a two-stage chemical precipitation process. In the first stage, reagents, including but not limited to, hydrochloric acid (HCl) 403, sodium sulphate ($NaSO_4$) 401, and/or potassium permanganate ($KMNO_4$) 402, may be added in mixing tank #1 510 containing the flowback water or brine (depending on whether the flowback water has been previously concentrated or not). The flowback water or brine is chemically treated in the mixing tank #1 510 and the pH may be adjusted to from about 3.5 to about 4.0. The pH may be further adjusted in mixing tank #2 515 by introducing sodium hydroxide (NaOH) 404 prior to separation of barium sulfate 405. A flocculation aid (such as polymer and hydrochloric acid) from the polymer coagulant tank 525 may also be added to the mixing tank #2 515 prior to separation of barium sulfate 405.

In the second stage, reagents, including but not limited to, sodium hydroxide (NaOH) 404, sodium carbonate ($Na2CO_3$) 517, a flocculation aid from the polymer coagulant tank 525 may be added to mixing tank #3 520, along with the effluent from mixing tank #2 515. The flowback water or brine is then chemically treated in the mixing tank #3 520 and the pH may be adjusted to from about 11.5 to about 12.0 prior to separation of strontium carbonate and calcium carbonate 530. The effluent from the second precipitation step may be subsequently sent to a concentration step 440 and a crystallization step 445 to obtain dry salt 550 which may be further processed to make sodium hypochlorite 552 or liquid salt solution 551.

Figure 5:
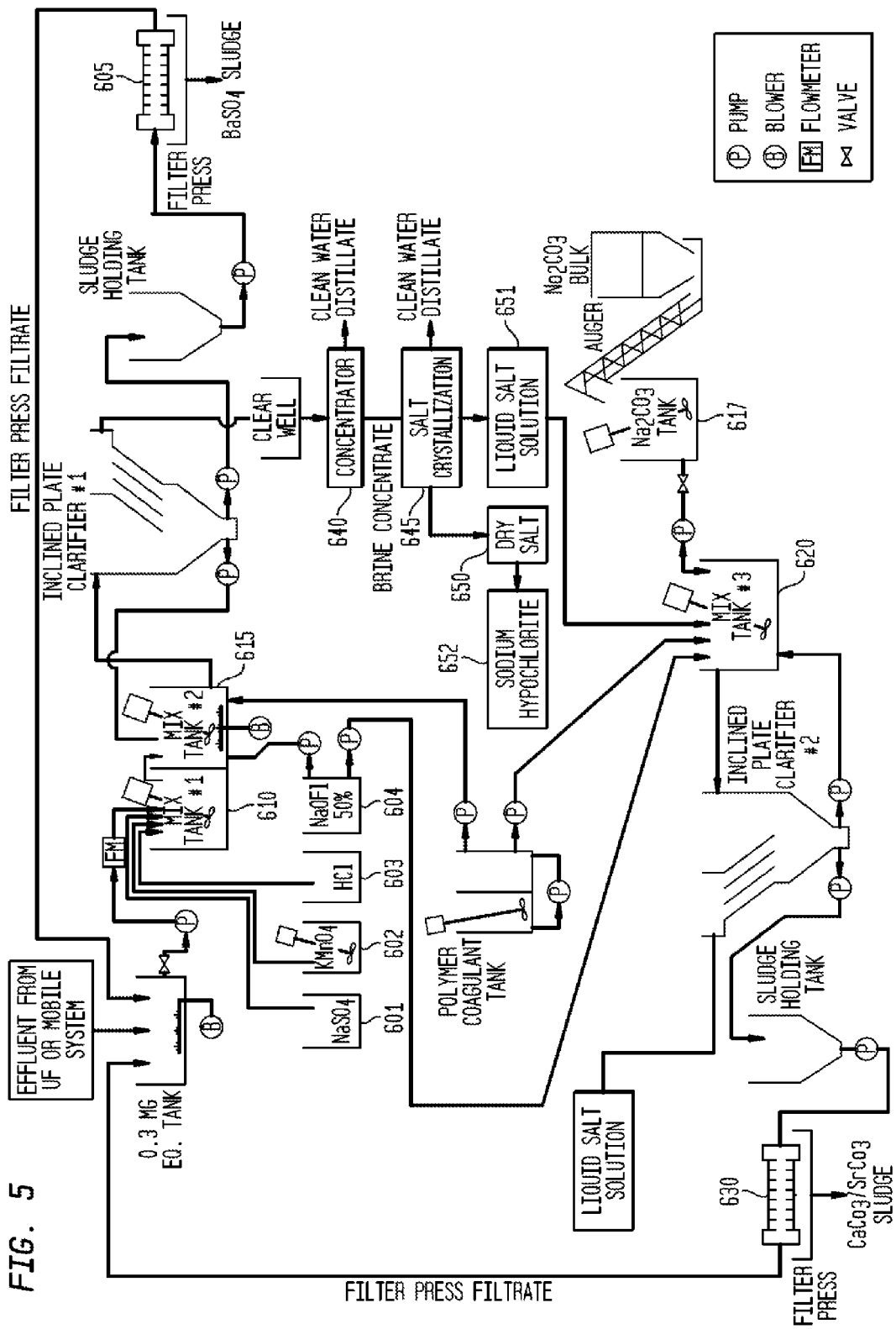
FIG. 5 is a flow diagram illustrating the chemical treatment step in accordance with another aspect of the invention.

FIG. 5 shows another embodiment of the chemical precipitation process of the present invention, where bariumسulfate ($BaSO_4$) 605 is precipitated out before collection of salt products 650, 651, and strontium carbonate ($SrCO_3$) and/or calcium carbonate ($CaCO_3$) are separated out from the collected salt solution 651.

In the first stage, reagents, including but not limited to, hydrochloric acid (HCl) 603, sodium sulphate ($NaSO_4$) 601, and/or potassium permanganate ($KMNO_4$) 602, may be added in mixing tank #1 610 containing the flowback water or brine (depending on whether the flowback water has been previously concentrated or not). The flowback water or brine is chemically treated in the mixing tank #1 610 and the pH may be adjusted to from about 3.5 to about 4.0. The pH may be further adjusted in mixing tank #2 615 by introducing sodium hydroxide (NaOH) 604 prior to separation of barium sulfate 605. A flocculation aid (such as polymer and hydrochloric acid) from the polymer coagulant tank 625 may also be added to the mixing tank #2 615 prior to separation of barium sulfate 605.

The effluent from the first chemical precipitation stage may then be concentrated 640 and subsequently crystallized 645 to obtain dry salt 650 which may be further processed to make sodium hypochlorite 652 or liquid salt solution 651.

The liquid salt solution 651 collected from the crystallization step may then be fed into another chemical precipitation step to obtain strontium carbonate ($SrCO_3$) and/or calcium carbonate ($CaCO_3$) 630.

This is done by introducing reagents, including but not limited to, sodium hydroxide (NaOH) 604, sodium carbonate ($Na2CO_3$) 617, a flocculation aid from the polymer coagulant tank 625 may be added to mixing tank #3 620. The liquid salt solution 651 is then chemically treated in the mixing tank #3 620 and the pH may be adjusted to from about 11.5 to about 12.0 prior to separation of strontium carbonate and/or calcium carbonate 630.

The inventors have learned that if strontium is precipitated out before the crystallization step, a large amount of calcium is precipitated along with strontium during the chemical precipitation step, reducing the overall amount of pure salt products. Accordingly, in a preferred embodiment, strontium carbonate is precipitated out after the crystallization step from the pure salt solution.

In another preferred embodiment, prior to the chemical precipitation process, the flowback fracwater is tested to identify the primary constituents. Based on identification of the constituents, a series of treatability studies can be performed to determine the effective amount of reagents to be added to remove the desired constituents from the flowback fracwater.

Providing a concentrated flowback brine 120 with the constant amount of constituents to be removed/contaminants is very important in overall effectiveness of certain preferred embodiments of the chemical precipitation process. If there is significant variation in constituent concentrations, specifically the two principal constituents, barium and strontium, there is a potential need to re-treat previously treated flowback brine to remove additional desired materials. This can waste time, energy and money. If too much reagent is added, not only is a new source of contamination introduced, but the process becomes inefficient and wasteful. Therefore, being able to monitor, sample and evaluate the chemical constituents of the brine and adjust the chemical precipitation steps accordingly can improve the chemical precipitation process performance and/or maximize pollutant removal efficiencies—an important step for ensuring the cost effectiveness. Thereafter, the appropriate amount of reagents can be added in accordance with the testing results.

After conducting a demonstration project at a site in Pennsylvania, the inventors learned that the concentrations and constituents of the flowback water vary significantly on a daily basis. Moreover, every well was producing a significantly different quality having different concentrations and constituents of the flowback water.

In addition, the inventors have learned that conducting a chemical precipitation process on-site may not be as cost effective since it must be designed to operate during the cold months of the year depending on the location of the well. It was also difficult to monitor, sample and evaluate the chemical constituents of the brine and adjust the chemical precipitation steps accordingly due to the variability in the concentrations and constituents of the flowback water. In short, the energy and labor cost involved in running an effective chemical precipitation process on-site may therefore be high.

Accordingly, rather than chemically treating the flowback water on a continuous or semi-continuous basis on-site, in a preferred embodiment, the present invention contemplates concentrating the flowback water first on-site and returning the clean condensate produced by the evaporator to the drilling site for reuse, and trucking the concentrated flowback brine, which is now much lower in volume, to an off-site plant for chemical precipitation and crystallization processes.

This provides advantage in the overall cost and efficiency of the chemical treatment process since the concentration and the constituents to be precipitated out of the flowback brine in the concentrated brine can be adjusted at to a constant level by mixing different batches of the flowback brine before introducing the water to the chemical precipitation process.

Crystallization

The chemically treated brine can be sent to one or more crystallization step 212B as shown in FIG. 2. The chemically treated concentrated brine maybe also be stored in holding tanks 700 prior to and/or instead of further processing.

Figure 6:
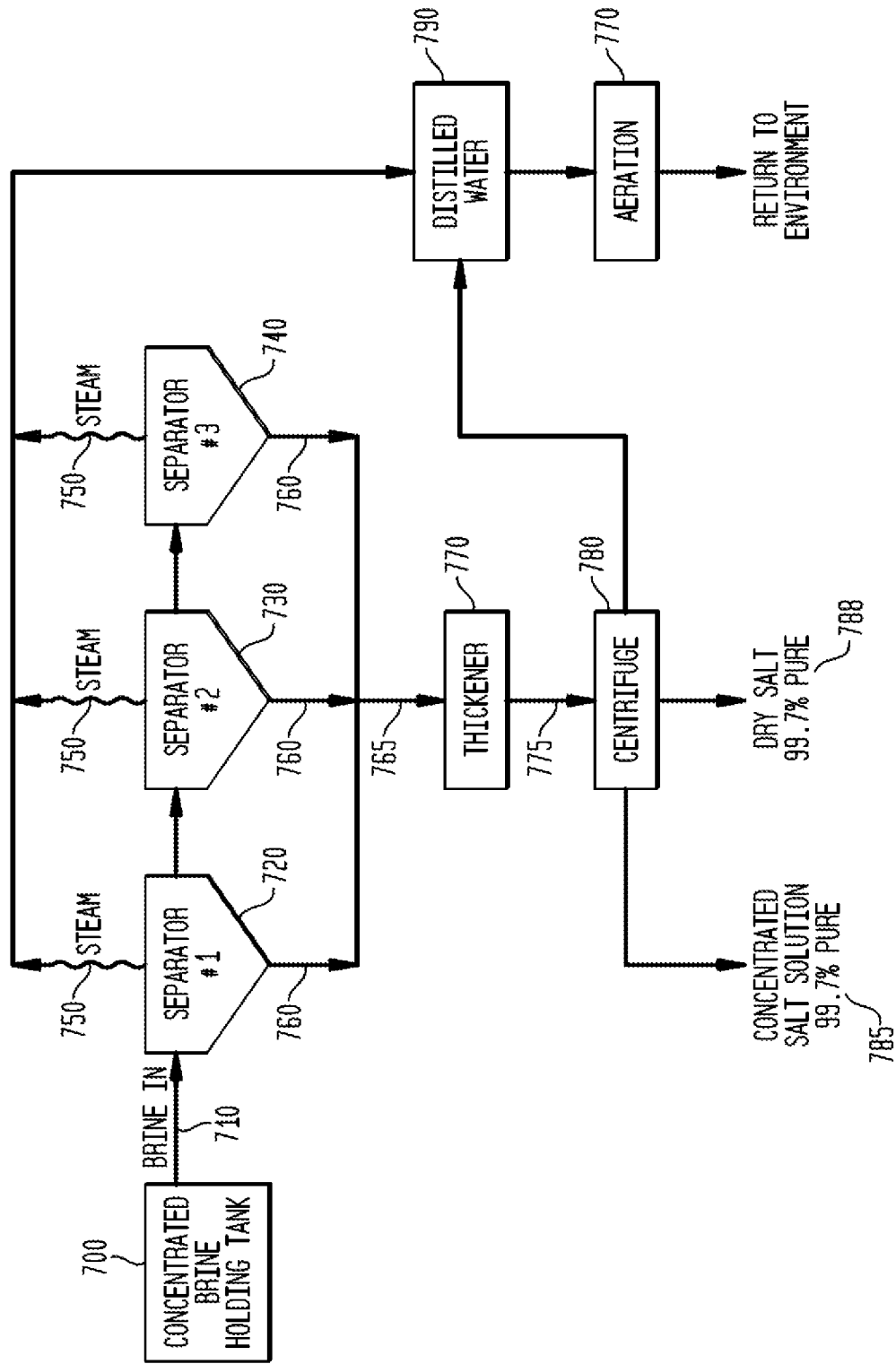
FIG. 6 is a flow diagram illustrating the crystallization step in accordance with an aspect of the invention.

The effluent brine can be crystallized using various methods known in the art, including but not limited to, using multi-effect evaporators, one or more mechanical vapor recompression evaporators, or combinations thereof. For example, FIG. 6 provides a simplified process flow diagram of the crystallization step using multi-effect evaporators. FIG. 7 illustrates using a mechanical vapor recompression evaporator 801 for the crystallizing step.

As illustrated in FIG. 6, in accordance with one embodiment of the present invention, the concentrated and chemically treated brine may flow through a three-stage distilling process 720, 730, and 740 which yields two products, i.e., steam 750 and a much more highly concentrated brine 760. From steam generated 750, distilled water 790 may be produced which may be returned to the environment or may be reused as hydro-fracturing water. The sludge component 765 produced by this point in the process has a total solid concentration well over 100,000 ppm. To further concentrate the sludge, it is next run through thickening process 770 that removes more of its liquid component. Finally, the concentrated sludge 775 from the thickening process may be centrifuged 780, producing two products 785: concentrated salt solution 785 and dry salt, in addition to the pure distilled water 790.

The liquid component from the centrifuging process is a high quality, over 98%, preferably over 99%, and more preferably 99.5% pure concentrated salt solution that can be used for dust control since it is a solution of calcium, sodium and magnesium chlorides, and for roadway de-icing. The 'dry' product of the centrifuging operation is over 98%, preferably over 99%, and more preferably 99.5% pure salt of a commercial grade that has 0.1% moisture or less and can be bagged and sold for water softening, pool water treatment, and other similar application.

In a preferred embodiment, over 98% pure dry salt, preferably over 99% pure dry salt, more preferably over 99.5% pure dry salt of sodium chloride is further processed to produce sodium hypochlorite by conventional methods known in the art. Units manufactured by Siemens called CHLOROPAC or acceptable other equivalents could be chosen and utilized for this purpose.

Table 6 indicates the respective characteristics, volume and weights of the salt products generated by an initial 150,000 gpd frac-water input 103 into the process.

TABLE 6

| Influent | Flow | 56,160 gpd |
| | TDS | 120,000 ppm |
| | TSS | 0 ppm |
| | O&G | 0 ppm |
| Effluent-Condensate | Flow | 37,440 gpd |
| | TDS | 10 ppm |
| | TSS | 0 ppm |
| | O&G | 0 ppm |
| Effluent-Saturated (Volume can vary by market demand) | Flow | 18,720 gpd |
| | TDS | 36,000 ppm |
| | TSS | 0 ppm |
| | O&G | 0 ppm |
| Effluent-Dry Salt (Mass can vary by market demand) | Moisture | 0.1% |
| | Mass of Solids | 50,585 lb/day |
| Evaporator | Heat Source | Steam |
| | No. of Effects | Three |
| | No. of Separation | Three |
| | Centrifuge | One |

It should be noted that once the well-drilling operation is complete and major portion of the flowback fracwater has been collected and treated, the production of natural gas from a particular well will continue to produce smaller amounts of fracwater combined with water from underground aquifers penetrated by the well ("production brine"). Such production brine will continue to be collected for the life of the well and treated.

The production brine may be transported to the brine treatment plant as shown in FIG. 1, where it will go through preseparation, ultrafiltration, concentration, chemical precipitation and crystallization steps to yield the same end-products as the process that occurs at the time of the drilling/hydro-fracturing operation 203.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for extracting natural gas and/or oil within a bedrock/shale formation with a high clean water recovery rate, the method comprising:
   drilling a well into a bedrock/shale formation;
   injecting water, sand and fracking fluid under high pressure into the bedrock/shale formation via the well;
   recovering hydro-fracturing wastewater from the well, the hydro-fracturing wastewater being selected from the group consisting of post-drilling flowback water and production brine water;
   removing oil from the hydro-fracturing wastewater;
   removing solid particulates from the hydro-fracturing wastewater;
   removing large organic molecules selected from the group consisting of benzene, ethylbenzene, toluene and xylene from the hydro-fracturing wastewater;
   after removing the oil and the solid particulates, adding an effective amount of at least one reagent to the hydro-fracturing wastewater to produce a chemically treated wastewater and a precipitate comprising at least one chemical constituent selected from the group consisting of barium and strontium;
   separating the precipitate from the chemically treated wastewater;
   after separating the precipitate, introducing the chemically treated wastewater to a crystallization process to produce sodium chloride solids, a calcium chloride solution and a clean water distillate containing less than 500 ppm of total dissolved solids, wherein the clean water distillate is usable as source water for hydro-fracturing or returnable to the environment; and
   drying the sodium chloride solids to produce over about 98% pure dry sodium chloride.

2. The method of claim 1, further comprising evaporating the hydro-fracturing wastewater before adding the at least one reagent to the hydro-fracturing wastewater to produce a concentrated brine containing from about 15 wt % to about 30 wt % of salt relative to the total weight of the concentrated brine and a first clean water distillate containing less than 500 ppm of total dissolved solids.

3. The method of claim 2, wherein the concentrated brine contains from about 20 wt % to about 30 wt % of salt relative to the total weight of the concentrated brine.

4. The method of claim 1, wherein the dry sodium chloride is over about 99% pure.

5. The method of claim 1, wherein the dry sodium chloride is over about 99.5% pure.

6. The method of claim 1, wherein the reagent is a compound selected from the group consisting of sodium sulphate, potassium permanganate, aluminum chloride, sodium carbonate, sodium hydroxide, hydrochloric acid and mixtures thereof.

7. The method of claim 1, further comprising heating the hydro-fracturing wastewater before adding the at least one reagent to the hydro-fracturing wastewater.

* * * * *